(12) United States Patent
Koppers et al.

(10) Patent No.: US 7,623,432 B2
(45) Date of Patent: Nov. 24, 2009

(54) METHOD OF RECORDING INFORMATION ON A MULTI LAYER RECORD CARRIER, AND DEVICE FOR RECORDING ON A DUAL LAYER RECORD CARRIER

(75) Inventors: Wilhelmus Robert Koppers, Eindhoven (NL); Hubert Cecile Francois Martens, Eindhoven (NL); Pierre Hermanus Woerlee, Eindhoven (NL); Johannus Leopoldus Bakx, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 257 days.

(21) Appl. No.: 10/562,895

(22) PCT Filed: Jun. 29, 2004

(86) PCT No.: PCT/IB2004/051045

§ 371 (c)(1),
(2), (4) Date: Dec. 29, 2005

(87) PCT Pub. No.: WO2005/004117

PCT Pub. Date: Jan. 13, 2005

(65) Prior Publication Data

US 2006/0187787 A1    Aug. 24, 2006

(30) Foreign Application Priority Data

Jul. 1, 2003   (EP) .................................. 03077059
Aug. 20, 2003  (EP) .................................. 03102608

(51) Int. Cl.
*G11B 7/20* (2006.01)

(52) U.S. Cl. ...................................... 369/94; 369/13.39
(58) Field of Classification Search .................. 369/94, 369/275.3, 59.25, 13.38, 13.39, 13.4, 280
See application file for complete search history.

(56) References Cited

U.S. PATENT DOCUMENTS 5,729,525 A * 3/1998 Ishida et al. ............. 369/275.3
6,370,091 B1 * 4/2002 Kuroda .................... 369/30.08
7,184,377 B2 * 2/2007 Ito et al. .................. 369/47.14

FOREIGN PATENT DOCUMENTS

EP    1204106 A2 *  5/2002
WO   2003060895 A1   7/2003

OTHER PUBLICATIONS

ISR: PCT/IB2004/051045.
Written Opinion: PCT/IB2004/051045.

* cited by examiner

*Primary Examiner*—Thang V Tran
*Assistant Examiner*—Lixi Chow

(57) ABSTRACT

Recordable DVD+R and DVD+R/W optical discs with two (or more) information layers are developed to double the data storage capacity and video recording time. A method and device are proposed to make dual layer DVD disc recordings compliant with the dual layer DVD-ROM standard Recording the data in a DVD-ROM compliant way on the dual layer DVD+R or DVD+R/W disc is obtained by shifting the middle zone area towards the inner radius of a disc in such a way that the data zones of both layers are filled up with data.

16 Claims, 4 Drawing Sheets

METHOD OF RECORDING INFORMATION ON A MULTI LAYER RECORD CARRIER, AND DEVICE FOR RECORDING ON A DUAL LAYER RECORD CARRIER

The invention relates to a method of recording information on a multi-layer record carrier. In particular, the invention relates to a method of recording information on a dual layer DVD+R or DVD+R/W disc, such that it becomes compliant with the dual layer DVD-ROM Standard.

Information is stored on optical record carriers according to specific rules and layouts, generally referred to as Formats, which are described in documents generally referred to as a Standards.

Recordable (both write-once and rewritable) optical storage for video and data applications is a rapidly growing market. For DVD+R discs, comprising a single information layer, the storage capacity is 4.7 Gbyte. This is a limited amount of storage for video recording and data applications. With MPEG2 compression it is possible to record one hour of high quality digital video and two hours of standard quality. More data storage capacity is desirable. An option is to use optical discs with multiple information layers. Such discs are already available for DVD-ROM.

Recordable optical discs with two information layers are developed to double the data storage capacity and video recording time. Such a dual layer disc is schematically shown in FIG. 1. The dual layer disc comprises two information layers, generally referred to as the L0 and L1 layers. The L0 layer is the information layer located closest to the side of a disc where a radiation beam, such as a laser beam, used for reading and/or recording the information enters the disc.

A dual layer DVD+R disc has recently been suggested by Philips and is disclosed in International Patent Application WO 03/060895-A 1. Such a disc is in principle compatible with the dual layer DVD-ROM Standard. As an example, the reflection levels of both layers are >18% which adheres to the DVD-ROM Standard (Standard ECMA-267, 120 mm DVD-Read-only disc).

It is, however, a problem that the information recorded on a dual layer recordable DVD disc cannot always be reproduced on a DVD-ROM player without errors. This, so-called compatibility issue, is especially a problem since a large installed base of DVD-ROM players is already available all around the world.

It is an object of the present invention to provide a method of recording a multi layer record carrier, and especially a dual layer recordable DVD disc, in such a way that it can be reproduced in DVD-ROM players without errors.

Figure 1:
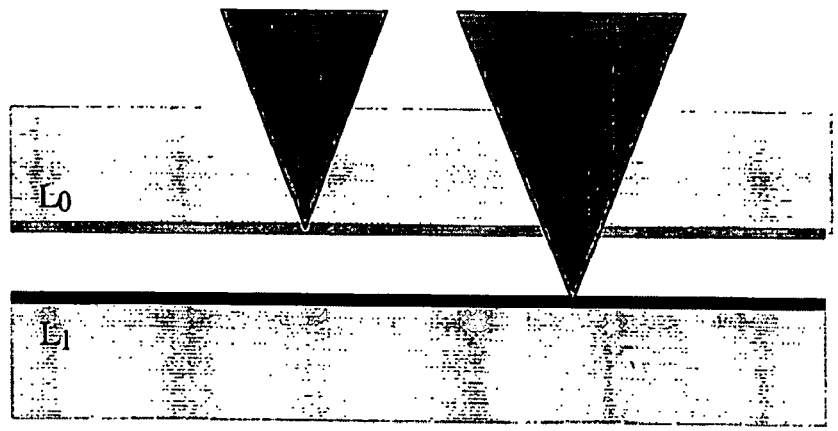
FIG. 1 shows a dual layer disc.
Figure 2A:
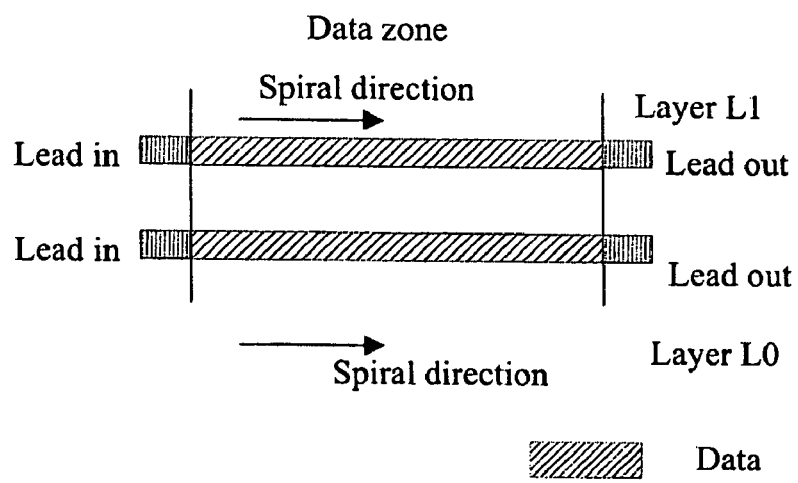
FIG. 2A shows a Parallel Track Path, PTP.
Figure 2B:
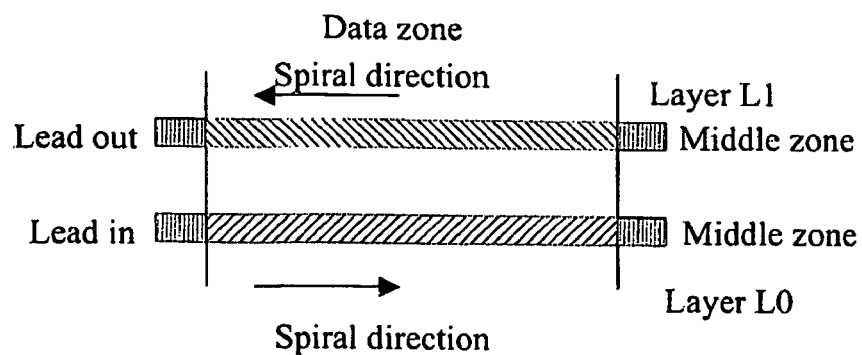
FIG. 2B shows an Opposite Track Path, OTP.
Figure 3A:
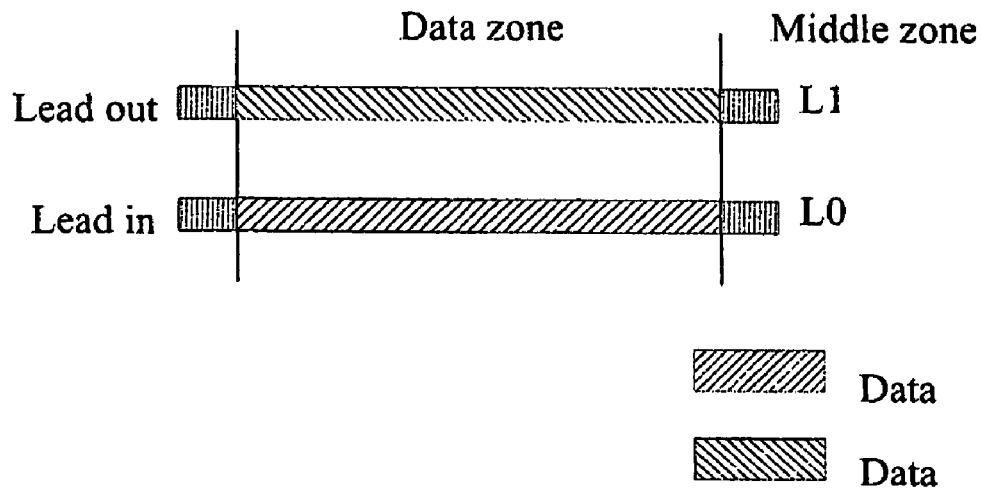
FIG. 3A shows a fully written OTP type dual layer DVD-ROM disc with the full amount of 8.5 GByte of data stored on the disc.
Figure 3B:
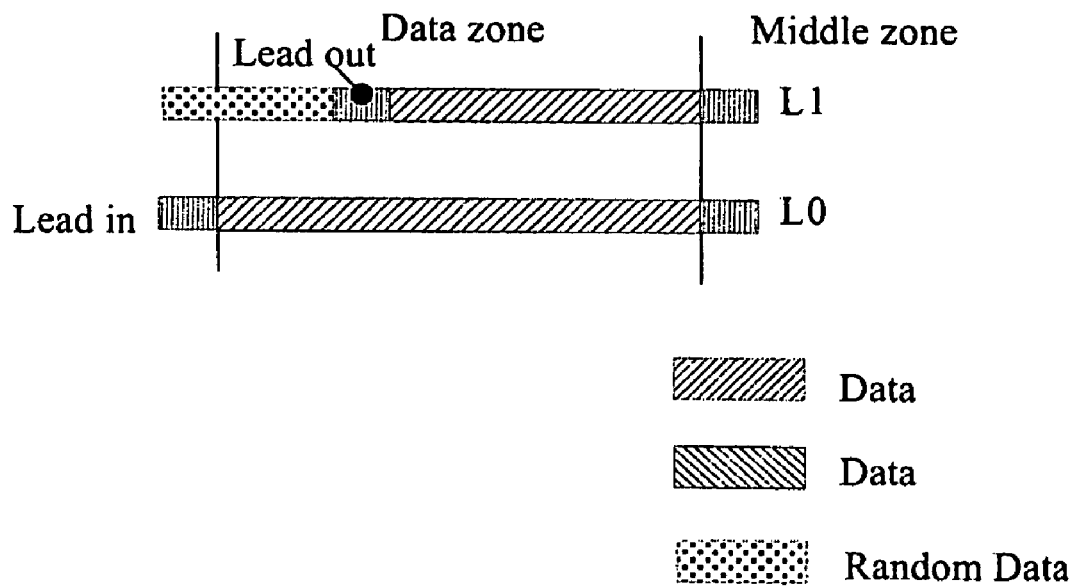
FIG. 3B shows a fully written OTP type dual layer DVD-ROM disc with less than the full amount of 8.5 GByte of data stored on the disc.

According to the dual layer DVD-ROM Standard two different disc types are described: Opposite Track Path, OTP, discs (shown in FIG. 2B), and Parallel Track Path, PTP, discs (shown in FIG. 2A). FIG. 3A shows a fully written OTP type dual layer DVD-ROM disc with the full amount of 8.5 GByte of data stored on the disc, while FIG. 3B shows a fully written OTP type dual layer DVD-ROM disc with less than the full amount of 8.5 GByte of data stored on the disc.

After finalization a dual layer DVD+R disc should comply with the dual layer DVD-ROM Standard, when it is to be played back on a DVD player (or DVD recorder). In this DVD-ROM Standard (Standard ECMA-267, 120 mm DVD-Read-only disc) it is demanded that the whole data zone after the lead out is written with data (data patterns) in case of an OTP type disc. In case of an OTP like dual layer DVD+R disc, the disc can in principle be closed when the data zone of layer L1 (or layers L0 and L1) is not completely written (see FIG. 4). However, such a recorded disc is not DVD-ROM compliant, because the whole data area is not filled with data, and problems can occur when it is inserted in a DVD-player (or a DVD-recorder) and played-back.

Figure 5:
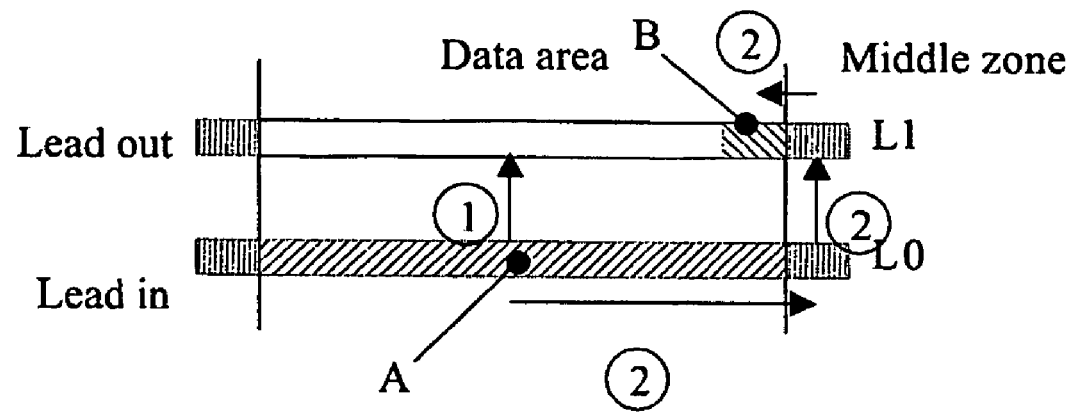
FIG. 5 shows two possible paths (path 1 and path 2) of a DVD player during play back jumping from layer L0 to layer L1.

FIG. 5 shows two possible paths (path 1 and path 2) of a DVD player during play back jumping from layer L0 to layer L1. The two possible search paths (path 1 and path 2) are indicated going from position A on L0 to position B on L1. Path 1 is the shortest and most likely option to be selected. However, during such a layer jump, or focusing routine, the read-out spot jumps to the blank data area. According to the DVD-ROM standard, data should be present here. Therefore, a DVD-ROM player will become confused and, most likely, reject the disc. This effect is confirmed by recent measurements.

Figure 6:
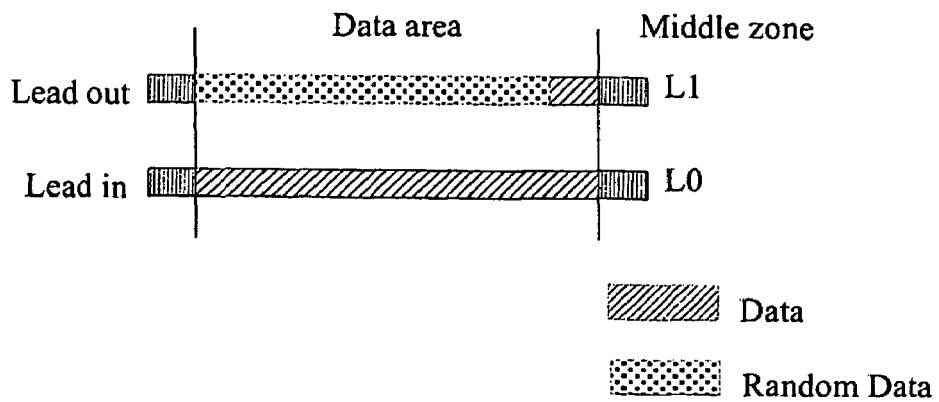
FIG. 6 shows finalizing the disc by writing dummy data, such as a random data pattern or an all-zero data pattern, on the remaining blank data area.

An option to solve this problem and to make a dual layer DVR+R or DVD+R/W disc DVD-ROM compliant is to finalize the disc by writing dummy data, such as a random data pattern or an all-zero data pattern, on the remaining blank data area, as is shown in FIG. 6. However, this may take a considerable amount of time (up to over one hour), which is unacceptable for consumer applications.

The recording method and recording device according to the present invention allow for making dual layer DVD+R or DVD+R/W disc recordings compliant with the dual layer DVD-ROM OTP standard without significantly increasing the recording time (including the finalization time), thereby increasing the ease of use and guaranteeing playback of the recorded disc on any DVD players now in the market.

Figure 7:
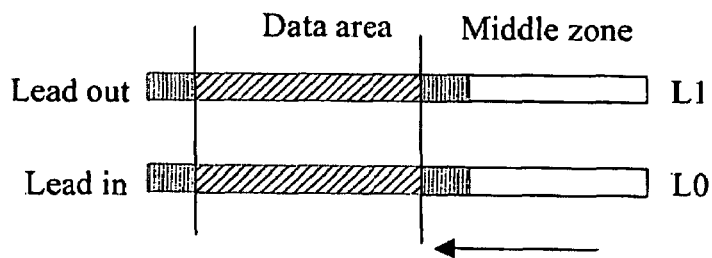
FIG. 7 shows the data is recorded while shifting the middle zone area toward the inner radius of the disc in such a way that the whole data area is filled up with data.

According to the invention, writing the data (for example a video-stream) in a DVD-ROM compliant way on the dual layer DVD+R or DVD+R/W disc is done by shifting the middle zone area towards the inner radius in such a way that the data zones of both information layers are filled up with data. The data is recorded while shifting the middle zone area towards the inner radius of the disc in such a way that the whole data area is filled up with data, as is shown in FIG. 7.

Besides that a DVD-ROM compliant disc is produced, this method has the advantages that no time-consuming finalization procedure has to be performed because no dummy date needs to be recorded.

Figure 8:
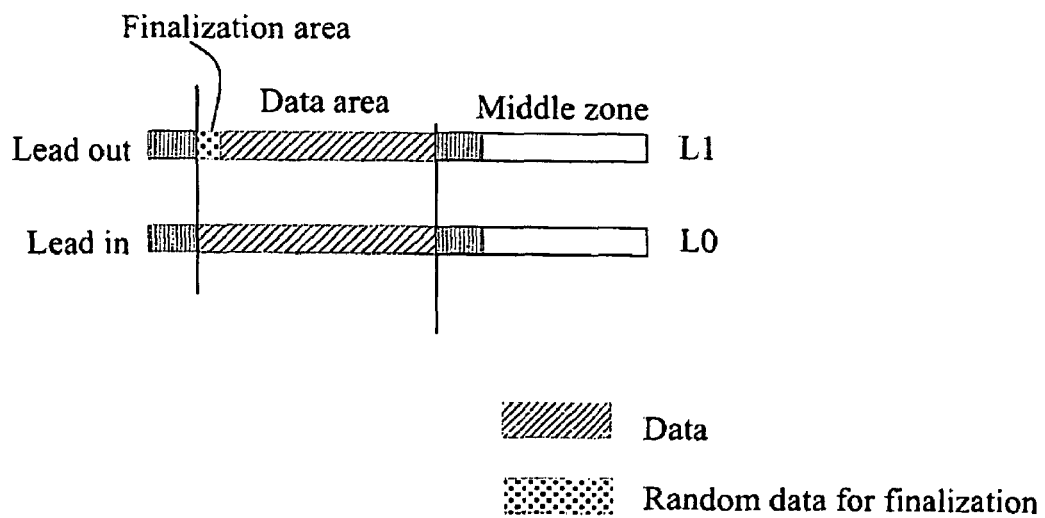
FIG. 8 shows a recording on a dual layer DVD+R disc in such as a way that the finalization area is minimized.

In an embodiment of the invention, it is proposed to minimize the finalization area. This is especially advantageous when it appears difficult to exactly tune the shift of the middle zone area. FIG. 8 shows a recording on a dual layer DVD+R disc in such as a way that the finalization area is minimized. The size of the finalization area should be significantly smaller that the size of the data area (for example smaller than 5% of the data area).

Figure 4:
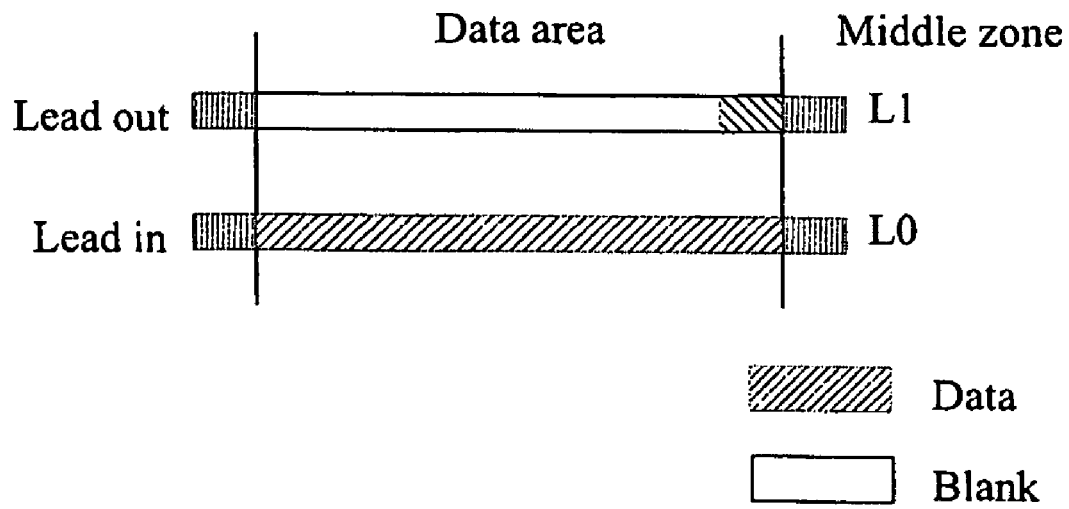
FIG. 4 shows the disc can in principle be closed when the data zone of layer L1 (or layers L0 and L1) is not completely written.

In a further embodiment the data content is evenly distributed over both information layers L0 and L1. When the size of the data content is known (for example in case of recording from hard disc to dual layer DVD+R or DVD+R/W disc, or during disc-to-disc recording), this content can be evenly distributed over both information layers. For example, when 6 GByte of data has to be copied from a hard disc to a dual layer DVD+R disc. Instead of writing 4.7 GByte on layer L0 and 1.3 GByte on layer L1 (as shown in FIG. 4 and FIG. 6), it is proposed to write 3 GByte on layer L0 and 3 GByte on layer L1 by shifting the middle zone to the inner radius. Now, the data is written in such a way that a long finalization area is avoided (or made very small when still necessary).

In a further embodiment an estimate of the disc space required for storing the data is made prior to the recording itself. This is especially useful when the recording time is known, for example when recording a video or data stream directly to a dual layer DVD+R or DVD+R/W. When the recording time is known (for example from a TV guide or from a time programmed in a video-recorder) we can beforehand make an estimate of the disc space that is needed. For example, a recording is programmed for 3 hours. Instead of recording 2 hours on layer L0 and 1 hour on layer L1, we propose to record 1.5 hours on layer L0 and 1.5 hours on layer L1. Preferably, some recoding space is reserved on layer L1 to anticipate for possible variable bit rates during compression of the stream.

It is noted that although the invention is explained with reference to a dual layer record carrier, it should be obvious to a man skilled in the art that the invention can be applied to multi layer record carriers having more than 2 information layers as well, without departing from the essence of the invention.

The invention claimed is:

1. A method of recording information on a user recordable multi-layer record carrier having a plurality of information layers including at least a first information layer and a second information layer for storing information, the method comprising acts of:
   receiving data content to be recorded on the user recordable multi-layer record carrier;
   recording the data content on the user recordable multi-layer record carrier such that the data content is substantially evenly distributed between each of the plurality of information layers and recorded in compliance with a ROM (read only memory) record carrier standard, wherein portions of the data content are recorded in data areas of the first and second information layers such that the data areas are superjacent; and
   shifting middle zone areas of at least the first and second information layers towards an inner radius of the disc such that inner radius data areas of the first and second information layers are filled with a portion of the recorded data content if the user recordable multi-layer record carrier is recorded with less than a full capacity of the user recordable multi-layer record carrier.

2. The method of claim 1, wherein the recordable multi-layer record carrier is an optical disk.

3. The method of claim 1, wherein recording comprises acts of dividing the received data content into portions of substantially equal size, and recording the portions of the data content to the data areas of the plurality of information layers.

4. The method of claim 3, wherein dividing the data content into portions of substantially equal size comprises an act of dividing the data content based on recording time.

5. The method of claim 3, wherein dividing the data content into portions of substantially equal size comprises an act of dividing the data content based on a size of the data content to be recorded.

6. The method of claim 1, wherein the data content is video data.

7. The method of claim 1, wherein the data content is audio data.

8. The method of claim 1, wherein the data content is audio/visual data.

9. A user recordable multi-layer record carrier, said record carrier comprising:
   a plurality of information layers including at least a first information layer and a second information layer for storing data content recorded on the user recordable multi-layer record carrier such that the data content is substantially evenly distributed between each of the plurality of information layers and recorded in compliance with a ROM (read only memory) record carrier standard, wherein portions of the data content are recorded in data areas of the first and second information layers such that the data areas are of substantially equal size and are superjacent and wherein middle zone areas of at least the first and second information layers are shifted towards an inner radius of the disc such that inner radius data areas of the first and second information layers are filled with a portion of the recorded data content if the user recordable multi-layer record carrier is recorded with less than a full capacity of the user recordable multi-layer record carrier.

10. A method of recording information on a user recordable multi-layer optical disc having a plurality of information layers, the method comprising acts of:
   receiving data content to be recorded on the user recordable multi-layer optical disk; and
   recording the data content in data areas of the plurality of information layers such that the data content is substantially evenly distributed between each of the plurality of information layers and recorded in compliance with a ROM (read only memory) record carrier standard, wherein recording includes an act of shifting middle zone areas of the plurality of information layers towards an inner radius of the disc if the user recordable multi-layer optical disk is recorded with less than a full capacity of the user recordable multi-layer optical disk such that the data area of the plurality of information layers are (i) substantially equal size, (ii) substantially filled with a portion of the recorded data content and are (iii) spatially aligned.

11. The method of claim 10, wherein recording the data content comprises an act of dividing the data content into portions of substantially equal size, and recording the portions of the data content to the data areas of the plurality of information layers.

12. The method of claim 11, wherein dividing the data content into portions of substantially equal size comprises an act of dividing the data content based on recording time.

13. The method of claim 11, wherein dividing the data content into portions of substantially equal size comprises an act of dividing the data content based on a size of the data content to be recorded.

14. The method of claim 10, wherein the data content is video data.

15. The method of claim 10, wherein the data content is audio data.

16. The method of claim 10, wherein the data content is audio/visual data.

* * * * *